(12) United States Patent
Nakano

(10) Patent No.: US 8,451,357 B2
(45) Date of Patent: May 28, 2013

(54) SOLID-STATE IMAGING DEVICE

(75) Inventor: Teppei Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 396 days.

(21) Appl. No.: 12/787,681

(22) Filed: May 26, 2010

(65) Prior Publication Data

US 2010/0302421 A1 Dec. 2, 2010

(30) Foreign Application Priority Data

May 27, 2009 (JP) .................................. 2009-127888

(51) Int. Cl.
*H04N 3/14* (2006.01)
*H04N 5/335* (2011.01)

(52) U.S. Cl.
USPC .......................................... 348/296; 348/308

(58) Field of Classification Search
USPC ................... 348/294, 296, 308, 312
See application file for complete search history.

(56) References Cited

U.S. PATENT DOCUMENTS

| | | | | |
|---|---|---|---|---|
| 6,794,627 B2 * | 9/2004 | Lyon et al. | ................. | 250/208.1 |
| 6,920,078 B2 * | 7/2005 | Cho | ........................ | 365/230.06 |
| 8,314,871 B2 * | 11/2012 | Fujita et al. | .................... | 348/308 |
| 2008/0284876 A1 * | 11/2008 | Makino | ..................... | 348/231.99 |

FOREIGN PATENT DOCUMENTS

| | | |
|---|---|---|
| JP | 2005-184358 | 7/2005 |
| JP | 2006-310932 A | 11/2006 |
| JP | 2007-173950 | 7/2007 |
| JP | 2007-194981 A | 8/2007 |
| WO | WO 03/079675 A1 | 9/2003 |

OTHER PUBLICATIONS

U.S. Appl. No. 13/419,638, filed Mar. 14, 2012, Mihara, et al.
Japanese Office Action issued Oct. 30, 2012 in Patent Application No. 2009-127888 with English Translation.

* cited by examiner

*Primary Examiner* — Daniel M Pasiewicz
(74) *Attorney, Agent, or Firm* — Oblon, Spivak, McClelland, Maier & Neustadt, L.L.P.

(57) ABSTRACT

According to one embodiment, a solid-state imaging sensor includes an imaging area, a vertical selector circuit, a pulse selector circuit and a timing generator circuit. The vertical selector circuit is provided with one row address comparator circuit corresponding to each of pixel rows. The row address comparator circuit is supplied with a row address in time division within one horizontal scanning interval with respect to the imaging area. Based on the comparison result of the row address comparator circuit, the vertical selector circuit outputs an electronic shutter row select signal and a read row select signal for setting an electronic shutter state and a read state of the corresponding pixel row.

3 Claims, 10 Drawing Sheets

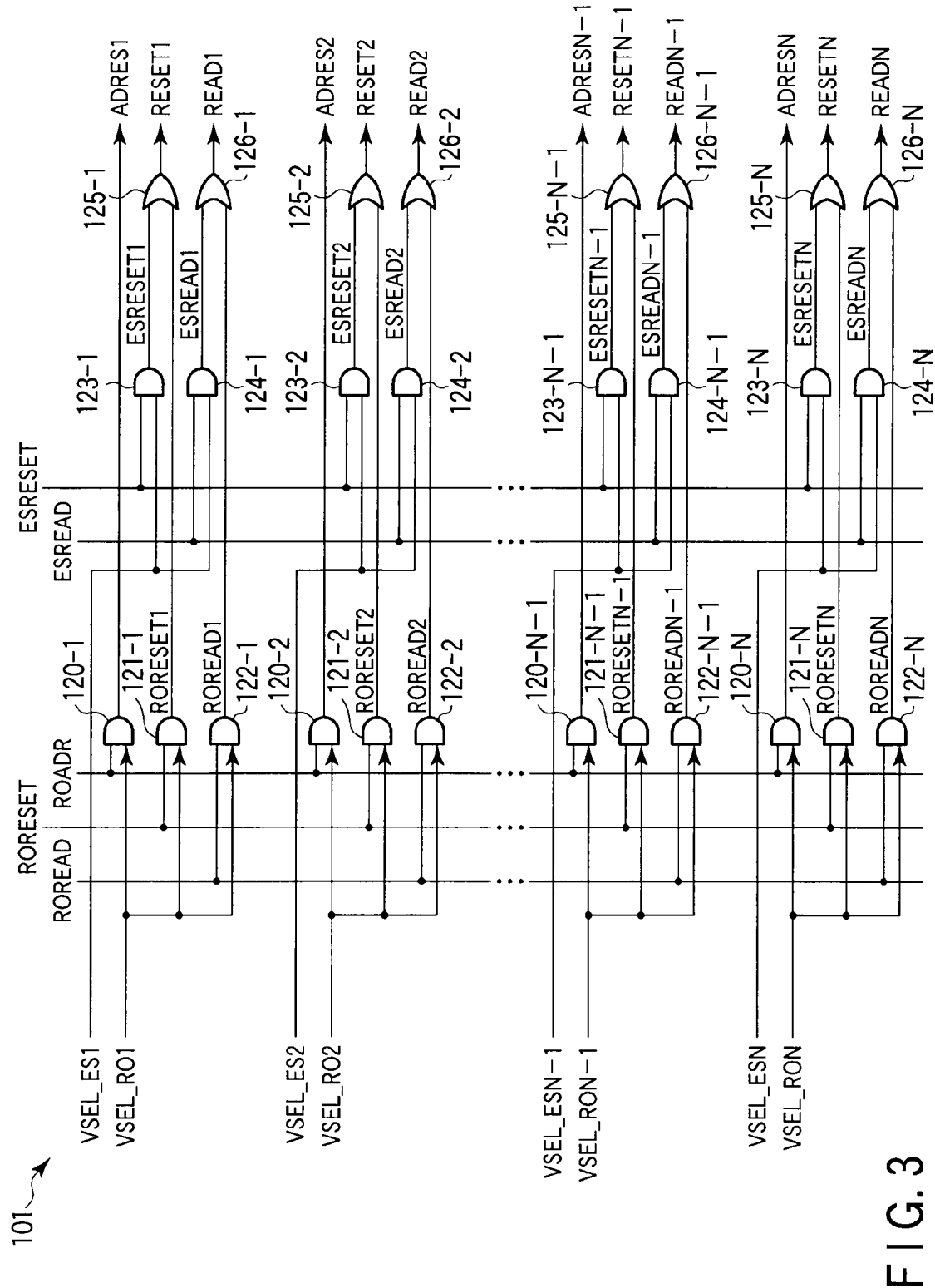
F I G. 3

SOLID-STATE IMAGING DEVICE

CROSS-REFERENCE TO RELATED APPLICATIONS

This application is based upon and claims the benefit of priority from Japanese Patent Application No. 2009-127888, filed May 27, 2009; the entire contents of which are incorporated herein by reference.

FIELD

Embodiment described herein relate generally to a solid-state imaging device, which is driven to set an electronic shutter state and a read state within one horizontal scanning interval so that a pixel row is selected.

BACKGROUND

A CMOS image sensor sets an electronic shutter state and a read state within one horizontal scanning interval in an imaging process, and includes a decoder circuit for performing control.

Jpn. Pat. Appln. KOKAI Publication No. 2005-184358 discloses the following CMOS image sensor. The CMOS image sensor includes several decoder circuits equivalent to the number of setting times of an electronic shutter state and a pixel read state every horizontal row of an imaging area. For this reason, the circuit scale becomes large.

An electronic shutter interval (storage interval) is equivalent to the timing difference between a start timing of an electronic shutter operation and a start timing of a pixel read operation. Therefore, if an electronic shutter interval is changed from short setting to long setting, there is a possibility that two kinds of electronic shutter intervals having different start timing overlap. In order to prevent the foregoing overlap, two pixel rows must be simultaneously selected. For this reason, a conventional CMOS image sensor is previously provided with two decoder circuits having the same circuit configuration. These decoder circuits set and control an electronic shutter state every horizontal row of an imaging area. The CMOS image sensor uses the foregoing two decoder circuits simultaneously or alternately when preventing the foregoing overlap. However, if two decoder circuits are prepared for each horizontal row, the circuit scale becomes large.

Moreover, the conventional CMOS image sensor includes a vertical line selector circuit capable of controlling a vertical thinning operation. According to the vertical thinning operation, a read operation is carried out while skipping pixel rows existing halfway in the vertical direction of an imaging area. When the foregoing vertical thinning operation is carried out, a charge is always induced in pixels of the skipped pixel rows. When a charge is continuously induced in the pixel, a phenomenon called as blooming happens; namely, the charge leaks in neighboring pixels. In order to avoid the foregoing phenomenon, in a vertical thinning read operation, a value specifying a skipping pixel row is set to a latch circuit before an electronic shutter operation. Then, the skipping pixel row selected based on the specified value is always discharged. However, there is a need to provide a latch circuit; for this reason, the circuit scale becomes large.

Moreover, when the conventional CMOS image sensor executes a simple vertical thinning process, the distance between pixels is separated; as a result, a false color is produced. This is a factor of reducing the image quality. For example, Jpn. Pat. Appln. KOKAI Publication No. 2007-173950 discloses a method of preventing an image quality from being reduced by the foregoing false color. According to the method disclosed in the foregoing Publication, signals of neighboring pixels in the vertical direction are averaged, and thereby, a captured image is reduced. This method does not thin and abandon a signal of part of pixels in the vertical direction as a thinning process, but analogically averages pixel signals of a plurality of pixels in the vertical direction using a vertical signal line and a current source. According to this method, information of pixels positioning halfway in the vertical direction is reflected; therefore, a generation of a false color is prevented. However, if the foregoing prevention is realized using the same method as above in a conventional CMOS image sensor, the following problem arises. Specifically, there is a need to change a vertical line selector circuit so that neighboring pixel rows are simultaneously driven; for this reason, the circuit scale becomes larger.

BRIEF DESCRIPTION OF THE DRAWINGS

FIG. 3 is a circuit diagram showing the detailed configuration of a pulse selector circuit shown in FIG. 1;

DETAILED DESCRIPTION

Figure 1:
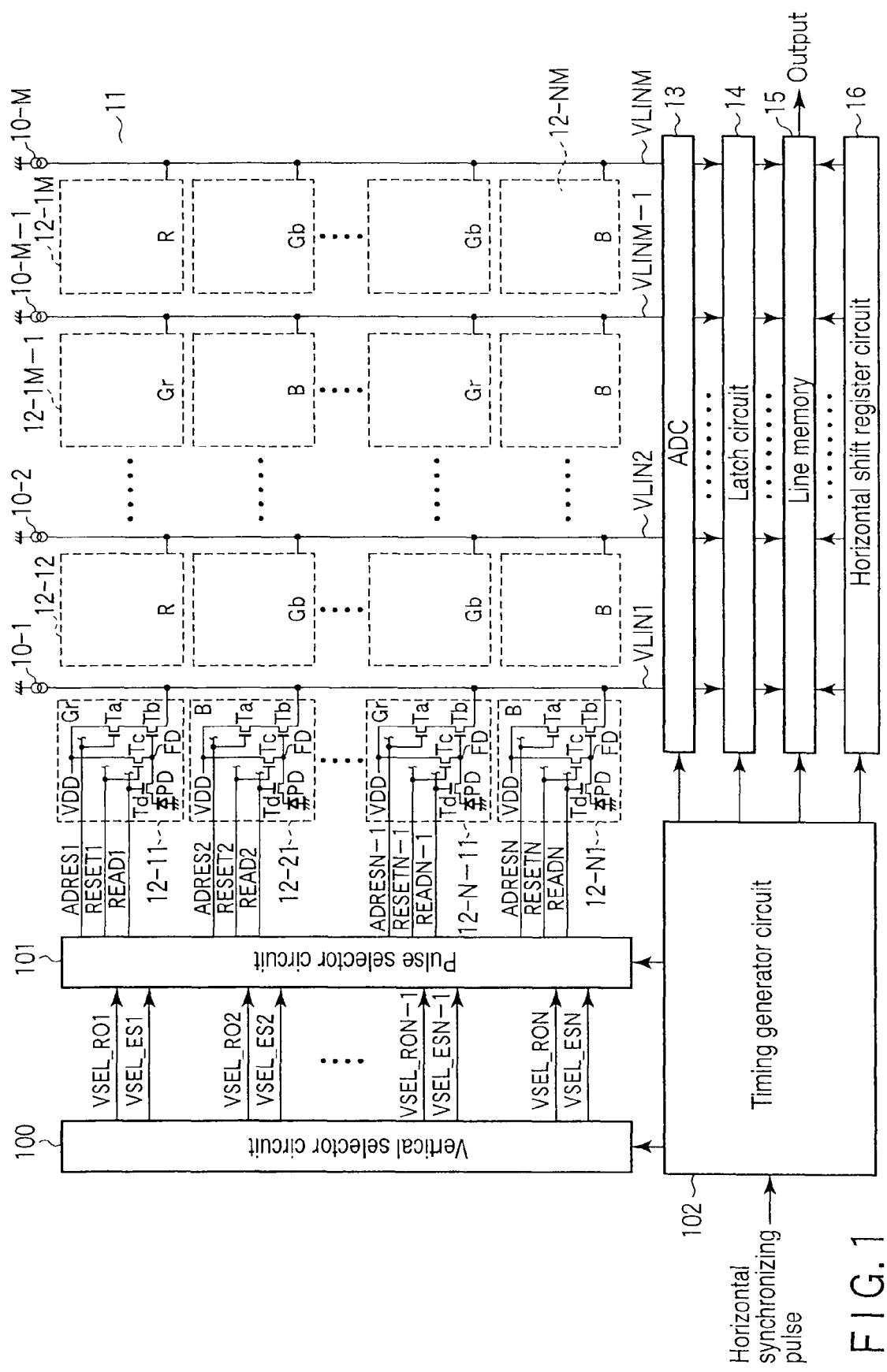
FIG. 1 is a block diagram showing the configuration of a solid-state imaging device according to an embodiment.

In general, according to one embodiment, a solid-state imaging sensor includes an imaging area, a vertical selector circuit, a pulse selector circuit and a timing generator circuit. The imaging area includes a plurality of pixel rows and columns having a plurality of pixels arrayed like a matrix. The vertical selector circuit is provided with one row address comparator circuit corresponding to each of the foregoing pixel rows. The row address comparator circuit is supplied with a row address in time division within one horizontal scanning interval with respect to the imaging area. Based on the comparison result of the row address comparator circuit, the vertical selector circuit outputs an electronic shutter row select signal and a read row select signal for setting an electronic shutter state and a read state of the corresponding pixel row. The pulse selector circuit supplies a plurality of drive pulse signals to each of a pixel row set to the electronic shutter state and to the read state based on the foregoing electronic shutter row select signal and read row select signal. The timing generator circuit generates the row address, and thereafter, supplies it to the vertical selector circuit. Simultaneously, the timing generator circuit controls the drive of the vertical selector circuit and the pulse selector circuit.

An embodiment will be hereinafter described with reference to the accompanying drawings. In the following description, the same reference numerals are used to designate portions common to all drawings.

FIG. 1 is a block diagram showing the circuit configuration of a solid-state imaging device, that is, a CMOS image sensor.

The sensor includes an imaging area 11, a plurality of vertical signal lines VLINj (j=1, 2, . . . , M−1, M), a plurality of current sources 10-j, a vertical selector circuit 100, a pulse selector circuit 101 and a timing generator circuit 102. The vertical selector circuit 100 includes a plurality of address comparator circuits and register circuits. These address comparator circuits and register circuits each set and control an electronic shutter state and a read state within one horizontal interval with respect to the imaging area 11. The pulse selector circuit 101 supplies a plurality of drive pulse signals to a pixel row of the imaging area 11 selected according to a state set by the vertical selector circuit 100. The timing generator circuit 102 generates various signals for controlling the foregoing vertical selector circuit 100 and pulse selector circuit 101. The vertical selector circuit 100 generates an electronic shutter row select signal and a read row select signal in time division every pixel row. Further, the circuit 100 executes time division multiplex setting control for setting an electronic shutter state and a read state according to time division multiplex.

Hereinafter, a detailed explanation will be made. The imaging area 11 is provided with pixels, that is, a unit cells 12-ij (i=1, 2, . . . , N−1, N and j=1, 2, . . . , M−1, M, and so forth). These pixels, that is, unit cells are two-dimensionally arrayed like a matrix such as N rows and M columns. Each of the vertical signal lines VLINj is connected corresponding to each pixel column.

Each unit cell 12-ij comprises four transistors, that is, a row select transistor Ta, an amplification transistor Tb, a reset transistor Tc and a read transistor Td and one photodiode PD. For example, one unit cell 12-11 has the following configuration; specifically, a current path of transistors Ta and Tb is interposed in series between a supply node of a power supply voltage VDD and a vertical signal line VLIN1. A gate electrode of transistor Ta is supplied with a row select drive pulse signal ADRES1. A current path of transistor Tc is connected between the supply node of the power supply voltage VDD and a gate electrode (floating diffusion region FD) of the transistor Tb. The gate electrode of the transistor Tc is supplied with a reset drive pulse signal RESET1. One terminal of a current path of the transistor Td is connected to the floating diffusion region FD, and a gate electrode thereof is supplied with a read drive pulse signal READ1. The other terminal of the current path of the transistor Td is connected with a cathode of the photodiode PD. An anode of the photodiode PD is connected to a ground node. In FIG. 1, symbols R, B, Gb and Gr described in each unit cell denote red, blue and green color cells, respectively. In particular, the symbol Gb denotes a green unit cell arrayed between blue unit cells, and the symbol Gr denotes a green unit cell arrayed between red unit cells.

One terminal of the imaging area 11, for example, the upper portion of FIG. 1 is provided with the current sources 10-j used for a source follower circuit, which are horizontally arrayed. Each current path of these current sources 10j is interposed between each one terminal of the vertical signal line VLINj and a ground node.

The other terminal of these vertical signal lines VLINj, for example, the lower portion of FIG. 1 is provided with an analog-to-digital converter circuit (ADC) 13, a latch circuit (14), a line memory 15 and a horizontal shift register circuit 16. Specifically, the latch circuit 14 latches a pixel signal converted into a digital signal by the ADC 13. The line memory 15 stores a signal latched by the latch circuit 14. The horizontal shift register circuit 16 executes the control for reading a signal from the line memory 15.

The foregoing vertical selector circuit 100 and pulse selector circuit 101 are arrayed adjacent to each other in the row direction of the imaging area 11. The pulse selector circuit 101 outputs a plurality of drive pulse signals for selecting and driving a pixel row of the imaging area 11 according to a plurality of read row select signals VSEL_ROi and electronic shutter row select signal VSEL_ES. In other words, the pulse selector circuit 101 supplies a row select drive pulse signal ADRESi, a reset drive pulse signal RESETi and a read drive pulse signal READi corresponding to a pixel row of the imaging area 11.

The timing generator circuit 102 generates various control signals according to a horizontal synchronizing pulse signal, and then, supplies them to the foregoing ADC 13, latch circuit 14, line memory 15, horizontal shift register circuit 16, vertical selector circuit 100 and pulse selector circuit 101.

Figure 2:
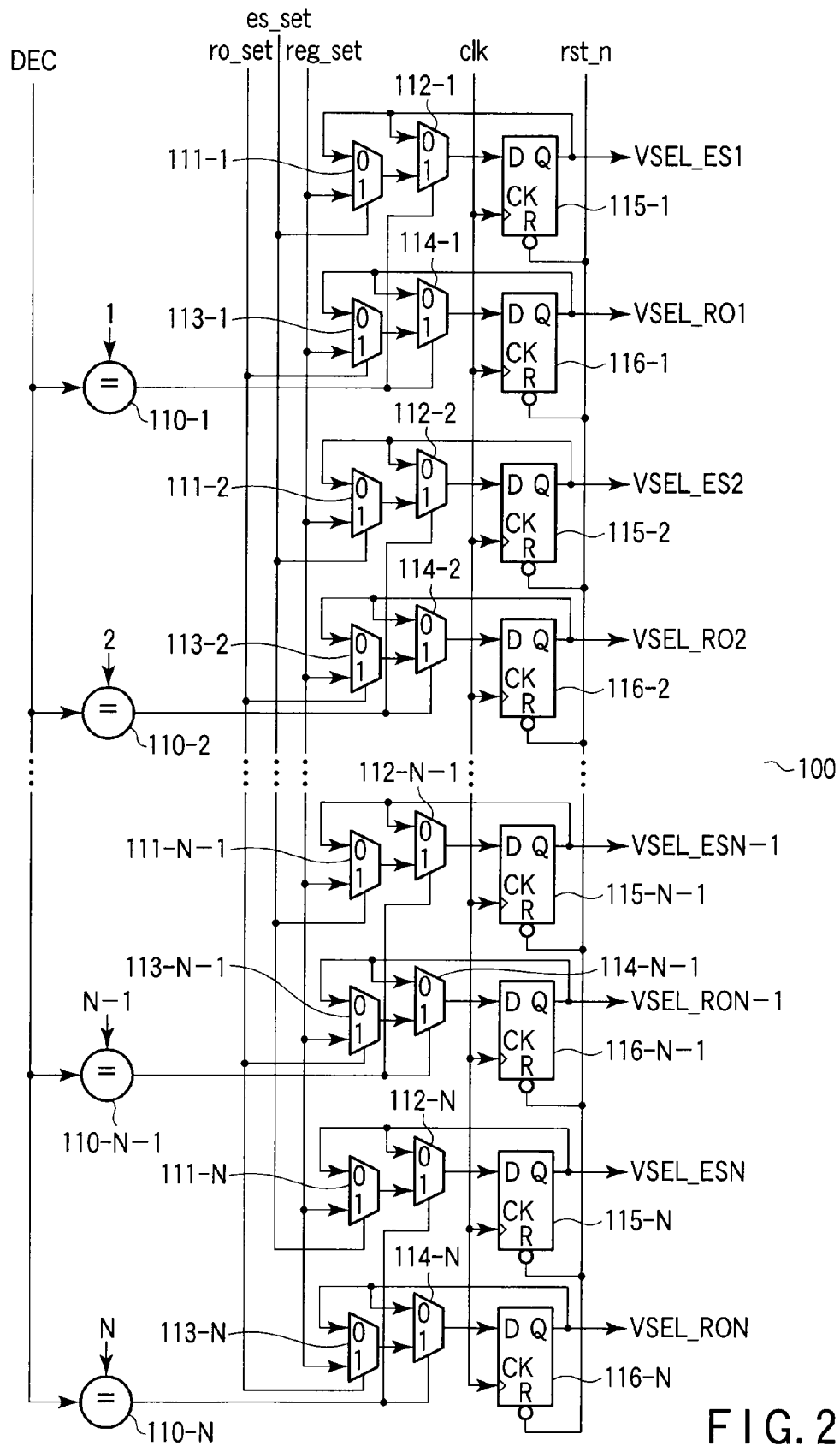
FIG. 2 is a circuit diagram showing the detailed configuration of a vertical selector circuit shown in FIG. 1.

FIG. 2 is a block diagram showing the detailed circuit configuration of the vertical selector circuit 100 shown in FIG. 1. The vertical selector circuit 100 the same circuit configuration corresponding to each pixel row of the imaging area 11. Further, the circuit 100 includes a row address comparator circuit 110-i, first to fourth selector circuits 111-i to 114-i, first and second registers 115-i and 116-i every pixel row.

The vertical selector circuit 100 is supplied with a row address DEC, a read set signal ro_set, a electronic shutter set signa es_set, a register value set signal reg_set, a clock signal clk and a asynchronous reset signal rst_n. The foregoing signals are generated by the timing generator circuit 102. The row address comparator circuit 110-i is concurrently supplied with a row address DEC so that a specific row address is individually input to each pixel row.

The first selector circuit 111-i is concurrently supplied with a register value set signal reg_set as one input, and concurrently supplied with an electronic shutter set signal es_set as a select signal. The second selector circuit 112-i is supplied with an output signal of the first selector circuit 111-i as one input, and supplied with an output signal of the row address comparator circuit 110-i as a select signal. The third selector circuit 113-i is concurrently supplied with a register value set signal reg_set as one input, and concurrently supplied with a read set signal ro_set as a select signal. The fourth selector circuit 114-i is supplied with an output signal of the third selector circuit 113-i as one input, and supplied with an output signal of the row address comparator circuit 110-i as a select signal.

The first register 115-i is supplied with an output signal of the second selector circuit 112-i as input D, and concurrently supplied with an asynchronous set signal rst_n and a clock signal clk. An output signal (output Q) of the first register 115-i is supplied as the other input to first and second selector circuits 111-i and 112-i. Further, the foregoing output signal (output Q) of the first register 115-i is output as an electronic shutter row select signal VSEL_ESi to each pixel row of the imaging area 11. The second register 116-i is supplied with an output signal of the fourth selector circuit 114-i as input D, and concurrently supplied with the asynchronous set signal rst_n and the clock signal clk. An output signal (output Q) of the second register 116-i is supplied to third and fourth selector circuits 113-i and 114-i as the other input. Further, the foregoing output signal (output Q) of the second register 116-i is output as a read row select signal VSEL_ROi to each pixel row of the imaging area 11.

Of vertical selector circuits 100, a circuit 100 corresponding to the first pixel row of the imaging area is given as an example, and the operation of the circuit 100 will be briefly explained below. A row address comparator circuit 110-1 compares a row address DEC with the corresponding specific row address. If the foregoing two row addresses coincide with each other, the circuit 110-1 outputs a level "1". Conversely, if the foregoing two row addresses do not coincide, the circuit 110-1 outputs a level "0". Generally, an i row address comparator circuit 110-i outputs a level "1" when a row address DEC is i while outputs a level "0" when the row address DEC is cases other than i.

First and second registers 115-1 and 116-1 are initialized when the asynchronous reset signal rst_n is a level "0"; therefore, the output Q is set to a level "0". When the reset signal rst_n is a level "1", a reset state is released. Further, first and second registers 115-1 and 116-1 capture a value of input D (output of second or fourth selector circuit 112-1 or 114-1) at the rise of the clock signal clk. Therefore, these first and second registers 115-1 and 116-1 hold the previous output value even if the clock signal clk changes when the output of the row address comparator circuit 110-1 is a level "0". On the other hand, when the output of the row address comparator circuit 110-1 is a level "1", these registers 115-1 and 116-1 capture output signals of first and third selector circuits 111-1 and 111-3, and thereafter, store them.

The first selector circuit 111-1 selects and outputs the output Q of the first register 115-1 when the electronic shutter set signal es_set is a level "0". On the other hand, the circuit 111-1 selects and outputs a value of the register value set signal reg_set when the electronic shutter set signal es_set is a level "1". Therefore, when the electronic shutter set signal es_set is a level "1" and the output of the row address comparator circuit 110-1 is a level "1", the register value set signal reg_set is supplied as input D to the first register 115-1.

In FIG. 2, a latch circuit may be used in place of first and second registers. This latch circuit is used, and thereby, the circuit scale is further reduced.

FIG. 3 is a block diagram showing the detailed configuration of the pulse selector circuit 101 shown in FIG. 1. The pulse selector circuit 101 has the same circuit configuration corresponding to each pixel row of the imaging area 11. Further, the circuit 101 includes first to fifth AND gates 120-i to 124i, first and second OR gates 125-i and 126-i every pixel row.

The pulse selector circuit 101 is supplied with the following various signals. One is a read control pulse signal ROREAD, and another is a read reset control pulse signal RORESET. Another is a read row select control pulse signal ROADR. Another is an electronic shutter read control pulse signal ESREAD. Another is an electronic shutter reset control pulse signal ESRESET. Another is an electronic shutter row select signal VSEL_ESi and a read row select signal VSEL_ROi, which are output from the vertical selector circuit 100. The foregoing control pulse signals ROREAD, RORESET, ROADR, ESREAD and ESRESET are generated by the timing generator circuit 102.

The first AND gate 120-i is concurrently supplied with a read control pulse signal ROREAD, and independently supplied with a read row select signal VSEL_ROi. The second AND gate 121-i is concurrently supplied with a read reset control pulse signal RORESET, and independently supplied with the read row select signal VSEL_ROi. The third AND gate 122-i is concurrently supplied with a read control pulse signal ROREAD, and independently supplied with the read row select signal VSEL_ROi. The fourth AND gate 123-i is concurrently supplied with an electronic shutter reset control pulse signal ESRESET, and independently supplied with an electronic shutter row select signal VSEL_ESi. The fifth AND gate 124-i is concurrently supplied with an electronic shutter read control pulse signal ESREAD, and independently supplied with the electronic shutter row select signal VSEL_ESi.

The first OR gate 125-i is supplied with an output signal RORESETi of the second AND gate 121-i and an output signal ESRESETi of the fourth AND gate 123-i. Then, the first OR gate 125-i outputs a reset drive pulse signal RESETi. The second OR gate 126-i is supplied with an output signal ROREADi of the third AND gate 122-i and an output signal ESREADi of the fifth AND gate 124-i. Then, the second OR gate 126-i outputs a read drive pulse signal READi.

Of pulse selector circuits 101, a circuit 101 corresponding to the first pixel row of the imaging area is given as an example, and the operation of the circuit 101 will be briefly explained below. First, second and third AND gates 120-1, 121-1 and 122-1 output signals ROADR1, RORESET1 and ROREAD1 based on control pulse signals ROREAD, RORESET, ROADR and read row select signal VSEL_RO1 output from the vertical selector circuit 100, respectively. When the read row select signal VSEL_RO1 is a level "1", the foregoing AND gates 120-1, 121-1 and 122-1 output signals ADRES1, RORESET1 and ROREAD1. When the read row select signal VSEL_RO1 is a level "0", these AND gates 120-1, 121-1 and 122-1 each output a level "0".

Fourth and fifth AND gates 123-1 and 124-1 output signals ESRESET1 and ESREAD1 based on the electronic shutter reset control pulse signal ESRESET, the electronic shutter read control pulse signal ESREAD, the electronic shutter row select signal VSEL_ES1, respectively. When the electronic shutter row select signal VSEL_ES1 is a level "1", AND gates 123-1 and 124-1 output signals ESRESET1 and ESREAD1. When the signal VSEL_ES1 is a level "0", AND gates 123-1 and 124-1 each output a level "0".

The first OR gate 125-1 outputs a reset drive pulse signal RESET1 to the corresponding pixel row based on output signals RORESET1 and ESRESET1 of second and fourth AND gates 121-1 and 123-1. The second OR gate 126-1 outputs a read drive pulse signal READ1 to the corresponding pixel row based on output signals ROREAD1 and ESREAD1 of third and fifth AND gates 122-1 and 124-1.

Figure 4:
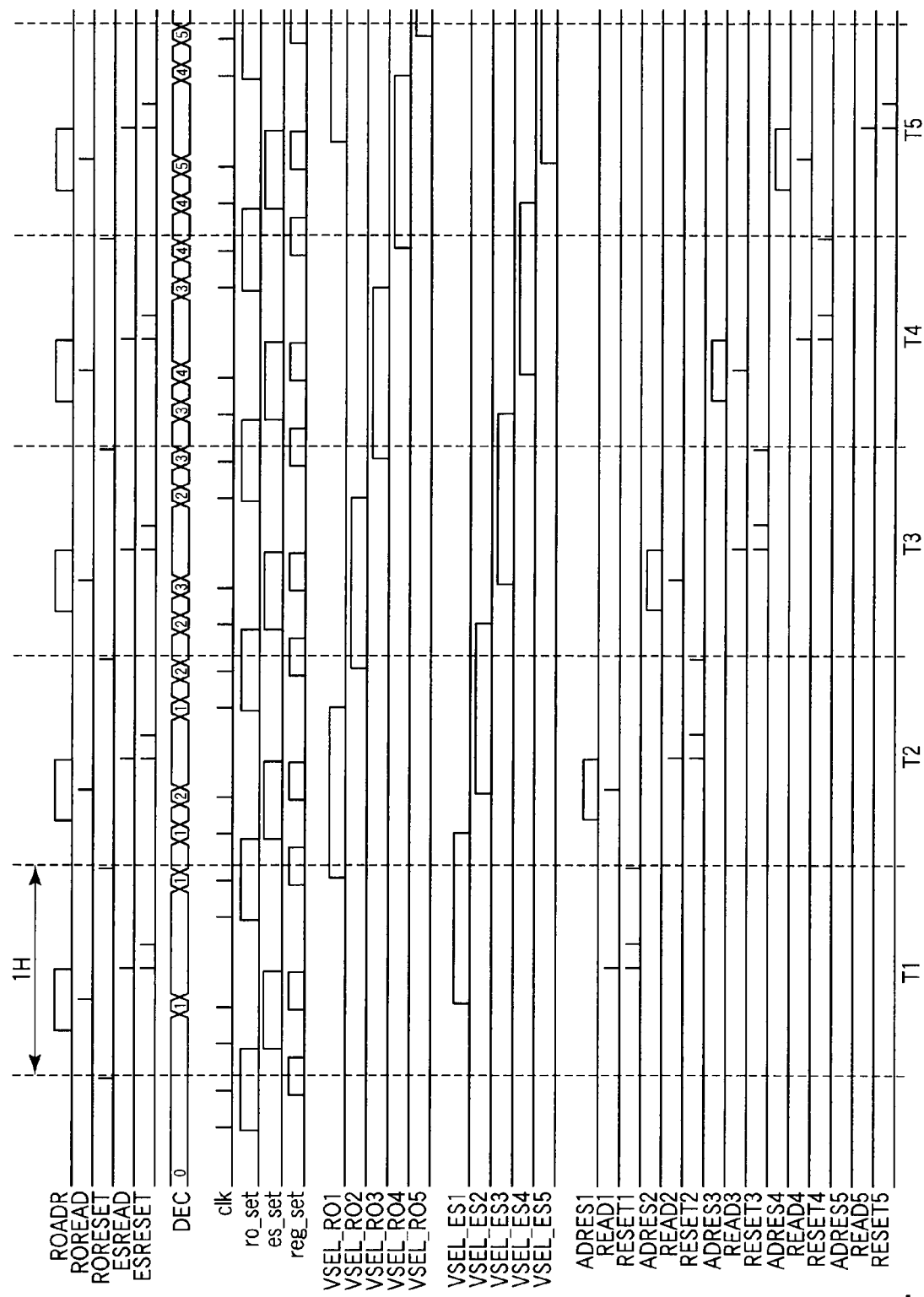
FIG. 4 is a timing chart to explain a standard read operation of a solid-state imaging device shown in FIG. 1.

Various operations of the image sensor shown in FIG. 1 will be explained below. FIG. 4 is a timing chart showing a standard read operation (when all rows are read). In each timing chart after FIG. 4, a symbol "1H" shown therein denotes an interval (i.e., one horizontal scanning interval) of reading one row of the imaging area 11 at reference timing.

Various read pulse signals ROADR, RORESET and ROREAD and various electronic shutter pulse signals ESRESET and ESREAD are input to the pulse selector circuit 101. These pulse signals are generated by the timing generator circuit 102 every 1H interval at the same timing according to the horizontal synchronizing pulse signal.

The row address DEC input to the vertical selector circuit 100 is control at a unit of 1H by the timing generator circuit 102. The read set signal ro_set is set to level "1" for intervals when pulse signals ROREAD and ROREST are not output. The electronic shutter set signal es_set is set to level "1" for intervals when pulse signals ESREAD and ESREST are not output. In this case, the foregoing two set signals ro_set and es_set are output so that they are not simultaneously set to level "1". The register value set signals reg_set are each set to level "1" at the second-half of intervals when signals ro_set and es_set are level "1". The clock signal clk is output when signals ro_set, es_set and reg_set are level "1", level "0" and level "0", when they are "1", "0" and "1", when they are "0", "1" and "0" and when they are "0", "1" and "1". In this way, the 1H interval is time-divided into an electronic shutter set interval and a read set interval.

An electronic shutter (discharge) operation will be explained below. In one horizontal interval (1H) shown by T1 in FIG. 4, when the register value set signal reg_set is set to a level "1", the electronic shutter set signal es_set is set to a level "1". The first selector circuits 111-*i* each output the signal reg_set set to level "1"; therefore, the output signal of the circuits 111-*i* are set as level "1". Further, when signals reg_set and es_set are both set to level "1", a row address DEC is set to level "1". When the row address is level "1", the output signal of the row address comparator circuit 110-1 of the vertical selector circuit 100 is set to level "1". Therefore, the second selector circuit 112-1 only of the vertical selector circuit 100 selects and outputs the output signal of the first selector circuit 111-1. Furthermore, when a clock signal clk is input in a state that a row address DEC is set to level "1", the output signal of the second selector circuit 112-1 is stored in the first register circuit 115-1. In this way, the electronic shutter row select signal VSEL_ES1 is set to level "1".

In the next one horizontal interval (1H) shown by T2, when the electronic shutter set signal es_set is set to a level "1" in a state that the register value set signal reg_set is set to a level "0", each output signal of the first selector circuits 111-*i* is set to level "0". Further, when signal reg_set is set to level "0" and signal es_set is set to level "1", a row address DEC is set to level "1". Therefore, as described above, the output signal of the row address comparator circuit 110-1 of the vertical selector circuit 100 is set to level "1". Consequently, the second selector circuit 112-1 of the vertical selector circuit 100 selects and outputs the output signal of the first selector circuit 111-1, which is set to level "0". Furthermore, when a clock signal clk is input in a state that a row address DEC is set to level "1", the output signal of the second selector circuit 112-1 is stored in the first register circuit 115-1. In this way, the electronic shutter row select signal VSEL_ES1 is set to level "0".

For an interval when signal VSEL_ES1 is level "1", the pulse selector circuit 101 is supplied with electronic shutter read and reset control pulse signals ESREAD and ESRESET. Output signals ESRESET1 and ESRESAD1 of fourth and fifth AND gates 123-1 and 124-1 of the pulse selector circuit 101 are synchronous with signals ESRESET and ESREAD, and thus, each set to level 1. Therefore, reset and read drive pulse signals RESET1 and READ1 are output from first and second OR gates 125-1 and 126-1. Hereinafter, in the same manner as above, electronic shutter row select signals VSEL_ES2, VSEL_ES3, . . . , VSEL_ESN−1, VSEL_ESN are successively set to level "1" every one horizontal scanning interval (1H). In accordance with the foregoing electronic shutter row select signals, reset drive pulse signals RESET2, RESET3, . . . , RESETN−1, RESETN and read drive pulse signals READ2, READ3, . . . , READN−1, READN are successively output. In this way, a pixel row of the imaging area 11 is successively selected, and then, reset and read drive pulse signals RESETi and READi are output every selected pixel row.

In each unit cell of the selected pixel row, reset and read drive pulse signals RESETi and READi are simultaneously set to level "1". In this way, reset transistor Tc and read transistor Td are simultaneously turned on, and therefore, the photodiode PD is discharged to the supply node of the power supply voltage VDD. Further, the reset drive pulse signals RESETi is set to "1"; therefore, the floating diffusion region FD is reset to a VDD level. In this way, each unit cell of the selected pixel row is discharged.

A pixel data read operation will be explained below. The pixel data read operation is basically the same as the foregoing electronic shutter operation. Specifically, register value set signal ro_set and register set signal reg_set and row address DEC are controlled so that read row select signal VSEL_ROi is successively set to level 1 every one horizontal scanning interval (1H). In this way, a pixel row whose pixel data is read is selected. Then, reset, row select and read drive pulse signals RESETi, ADRESi and READi are output every selected pixel row.

In each unit cell of the selected pixel row, reset drive pulse signal RESETi is set to level "1" in order to remove a noise signal by a dark current in the floating diffusion region FD before read is carried out, and thus, the reset transistor Tc is turned on. In this way, the floating diffusion region FD is reset to a voltage VDD. Further, the row select drive pulse signal ADRESi is set to level "1" so that the row select transistor Ta is turned on, and thereby, a source follower circuit including the amplification transistor Tb and the current source is operated. During an interval when the row select transistor Ta is turned on, the read drive pulse signal READi is set to level "1", and therefore, the amplification transistor Tb is turned on. In this way, a predetermined time elapses after a discharging operation is carried out, and thereafter, a signal charge photoelectrically converted and stored by the photodiode PD is amplified by the amplification transistor Tb. Therefore, the amplified voltage signal is read to the corresponding vertical signal line VLINi. The voltage signal is converted into a digital signal by the ADC 13, and thereafter, the converted digital signal is latched by the latch circuit 14, and then, successively read by way of the line memory 15.

In other words, the row address comparator circuit 110-*i* included in the vertical selector circuit 100 is supplied in time division with a row address within one horizontal scanning interval H with respect to an imaging area. Then, based on the comparison result by the row address comparator circuit 110-*i*, the vertical selector circuit 100 outputs electronic shutter and read row select signals for setting an electronic shutter state and a read state every pixel row. According to the foregoing control, even if the electronic shutter state and the read state are overlapped in the same pixel row of the imaging area, it is possible to set an electronic shutter state without increasing the circuit scale.

Figure 5:
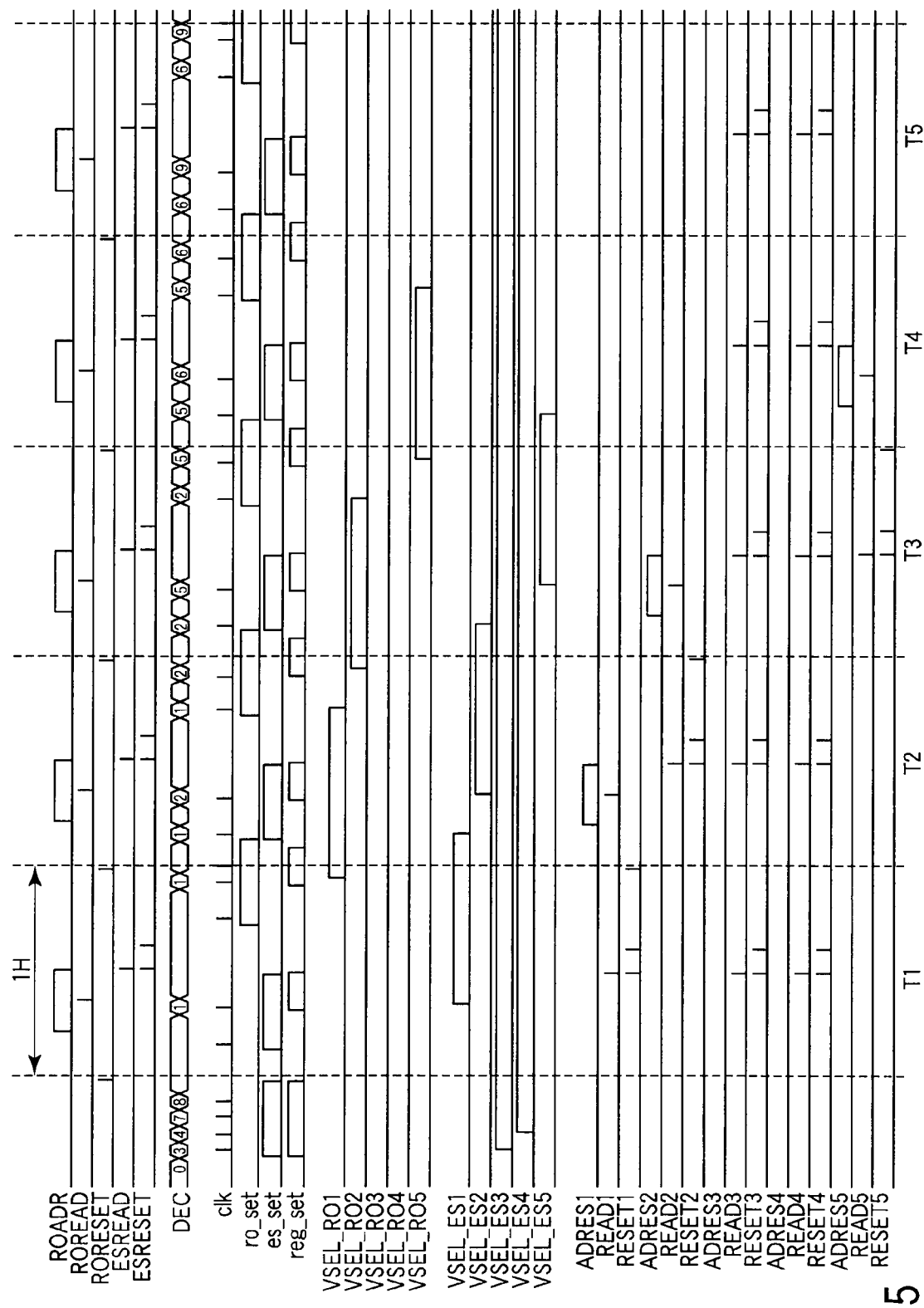
FIG. 5 is a timing chart to explain a vertical thinning read operation of a solid-state imaging device shown in FIG. 1.

FIG. 5 is a timing chart to explain a vertical thinning read operation. According to this example, a ½ thinning read operation is given as an example. According to the foregoing ½ thinning read operation, the number of selected rows with respect to an image area is half (½) of all rows read. FIG. 5 shows the case where read rows are set to first, second, fifth and sixth rows while skipped rows (discharge target rows) are set to third, fourth, seventh and eighth rows. Actually, there is a need to carry out the same process as third, fourth, seventh and eighth rows with respect to all rows skipped by thinning; in this case, the explanation will be omitted.

Specifically, the thinning read operation is different from the standard read operation described above; namely, electronic shutter and read operations are carried out while discharge target rows are skipped. In this case, a charge is always induced in a unit cell of a skipped row. If a charge is continuously induced, this is a factor of causing a problem called as blooming; namely, an induced charge leaks into neighboring pixels. In order to prevent the foregoing blooming, that is, in order that a unit cell of a skipped row is always discharged, the following setting is carried out. Specifically, the electronic shutter row select signal VSEL_ESi is always input to a discharge target row before an electronic shutter operation. For example, in one horizontal scanning interval (1H) shown by T0 of FIG. 5, when the register value set signal reg_set is set to level "1", the electronic shutter set signal es_set is set to level "1". Further, when the foregoing set signals reg_set and es_set are both set to level "1", row addresses DEC corresponding to skipped rows, that is, third, fourth, seventh and eighth rows are successively set synchronizing with a clock signal clk. Thereafter, electronic shutter row select signals VSEL_ES3, VSEL_ES4, VSEL_ES7 and VSEL_ES8 of third, fourth, seventh and eighth rows are set to level "1". As a result, as can be seen from FIG. 5, reset and read drive pulse signals RESET3, RESET4, READ3 and READ4 are output to third and fourth pixel rows every one horizontal scanning interval (1H). Thus, the same discharge operation as the case of FIG. 4 is carried out. In each of other rows except skipped rows, a discharge operation and a read operation are carried out as in the case of the standard read operation of FIG. 4.

As described above, the timing generator circuit 102 executes the following control in addition to the foregoing time division multiplex setting control. According to the control, the circuit 102 generates a plurality of row addresses within one horizontal scanning interval with respect to the imaging area 11, and thereafter, supplies them to the vertical selector circuit 100. Then, the circuit 102 controls the operation of vertical selector circuit 100 and pulse selector circuit 101. In this way, the circuit 102 thins pixel rows of the imaging area corresponding to the row addresses so that a pixel signal is read. In this case, there is no need to provide a conventionally required latch circuit for specifying skipped rows in order to specify skipped rows so that discharging is always carried out.

Figure 6:
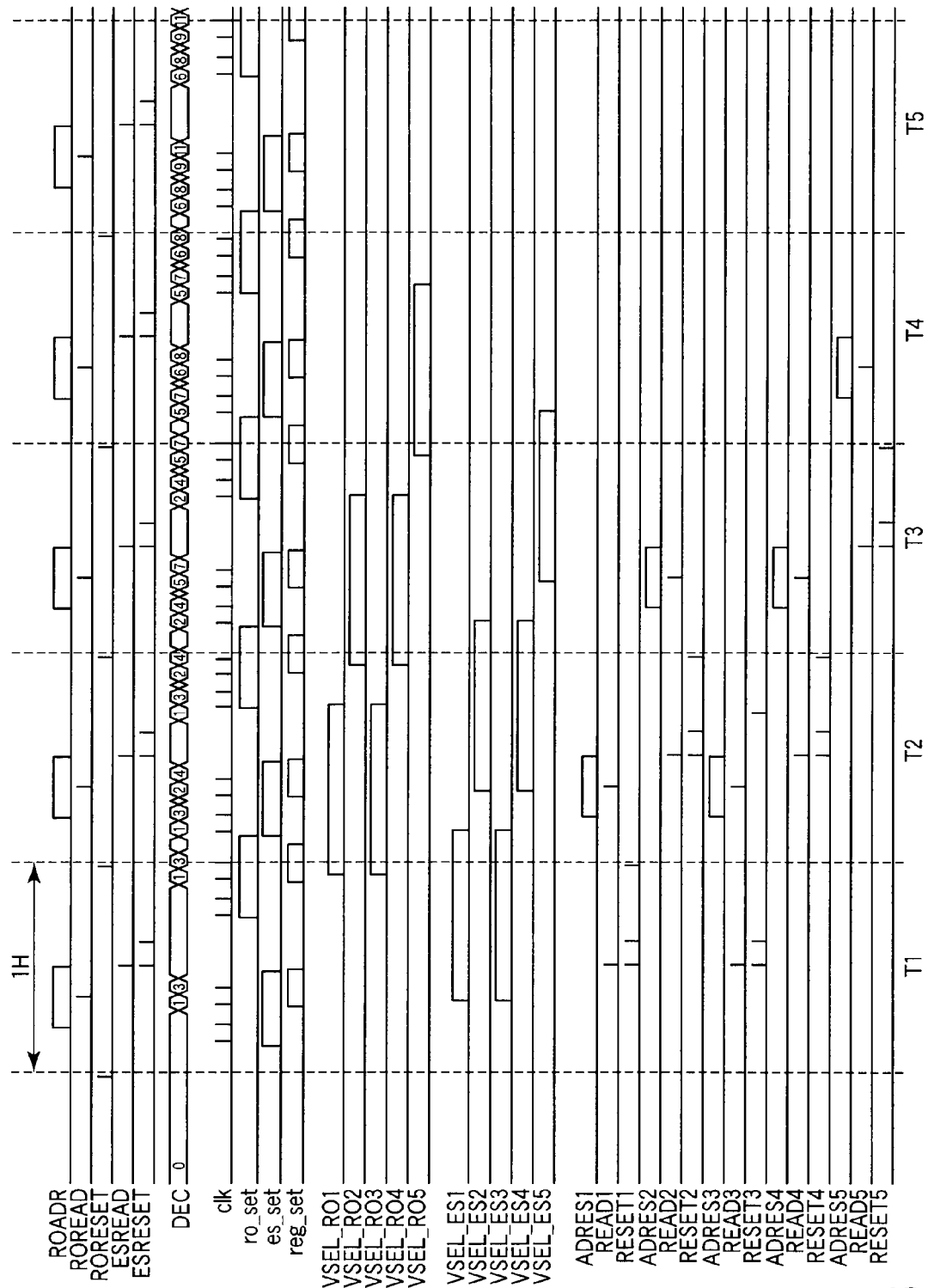
FIG. 6 is a timing chart to explain a pixel averaging read operation of a solid-state imaging device shown in FIG. 1.

FIG. 6 is a timing chart to explain an operation of averaging a plurality of pixel signals to carry out an imaging process. FIG. 6 is a timing chart showing the case of averaging two pixel signals. According to the standard read operation shown in FIG. 4, when electronic shutter and read operations are set, a row address corresponding one row for each operation is set every one horizontal scanning interval (1H). In contrast to the operation of FIG. 4, in FIG. 6, row addresses corresponding to a plurality of pixels whose signals are average are set. For example, in one horizontal scanning interval (1H) shown by T1 of FIG. 6, row addresses DEC are successively set to 1 and 3 in order to select first and third rows during the period when register value set signal reg_set and electronic shutter set signal es_set are both set to level "1". In synchronous with the foregoing setting, a clock signal clk is supplied. Thereafter, electronic shutter row select signals VSEL_ES1 and VSEL_ES3 of first and third rows are set to level "1". Moreover, row addresses DEC are successively set to 1 and 3 in order to select first and third rows during the period when register value set signal reg_set and read set signal ro_set are both set to level "1". In synchronous with the foregoing setting, a clock signal clk is supplied. Thereafter, read row select signals VSEL_RO1 and VSEL_RO3 of first and third rows are set to level "1".

In addition, when electronic shutter row select signals VSEL_ES1 and VSEL_ES3 and read row select signals VSEL_RO1 and VSEL_RO3 are set to level "0", row addresses corresponding to a plurality of pixels whose signals are average are successively set.

As can be seen from the foregoing description, the timing generator circuit 102 executes the following control in addition to the foregoing time division multiplex setting control. According to the control, the circuit 102 generates a plurality of row addresses within one horizontal scanning interval with respect to the imaging area 11, and thereafter, supplies them to the vertical selector circuit 100. Then, the circuit 102 controls the operation of vertical selector circuit 100 and pulse selector circuit 101. In this way, the circuit 102 thins pixel rows of the imaging area corresponding to the row addresses so that a pixel signal is read.

Figure 7:
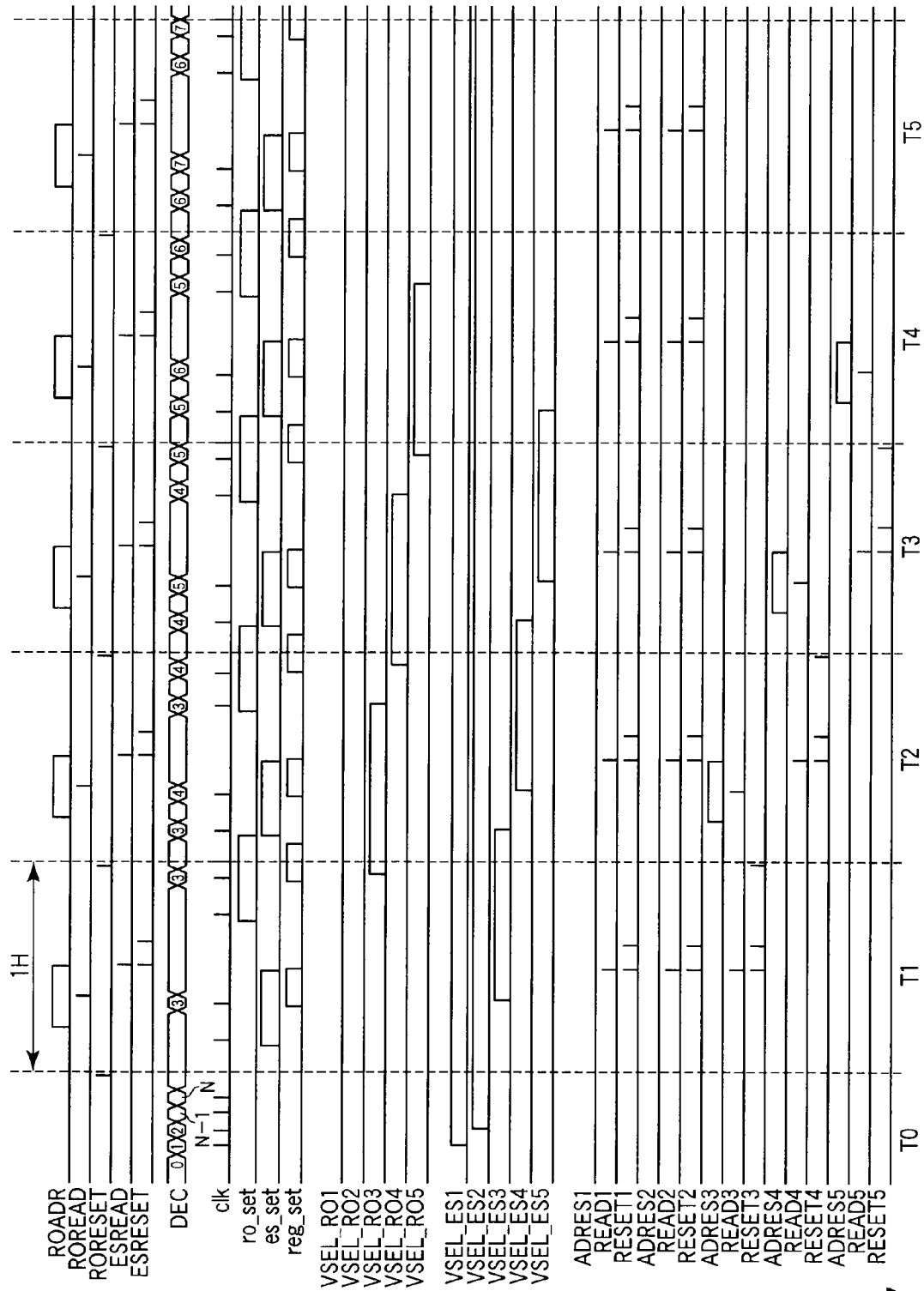
FIG. 7 is a timing chart to explain a sensor skipping read operation of a solid-state imaging device shown in FIG. 1.

FIG. 7 is a timing chart to explain a skipping operation. Skipping means a process of skipping one or the other end portions (upper or lower portion) of an imaging area 11 in the vertical direction and reading necessary areas only. Skipped areas are always set to a discharge state in the same manner as thinning considering blooming. The foregoing process is carried out before the electronic shutter operation as in the thinning process. FIG. 7 shows a timing chart when first, second, N−1 and N rows are set as a discharge target row. In one horizontal scanning interval (1H) shown by T0 of FIG. 7, when the register value set signal reg_set is set to level "1", the electronic shutter set signal es_set is set to level "1". Further, when the foregoing two register set signals reg_set and es_set are both set to level "1", row addresses DEC corresponding to skipped rows, that is, 1, 2, N−1 and N are successively set in synchronous with a clock signal clk. Thereafter, electronic shutter row select signals VSEL_ES1, VSEL_ES2, VSEL_ESN−1 and VSEL_ESN of first, second, N−1 and N rows are set to level "1". As a result, as can be seen from FIG. 7, reset and read drive pulse signals RESET1, RESET2, READ1 and READ2 are output to first and second pixel rows every one horizontal scanning interval (1H). In this way, a discharge operation is carried out every foregoing 1H as in the case of the standard read operation of FIG. 4. In each of other rows except skipped rows, a discharge operation and a read operation are carried out as in the case of the standard read operation of FIG. 4. In this case, there is no need to provide a conventionally required latch circuit for specifying skipped rows in order to specify skipped rows so that discharging is always carried out.

Figure 8A:
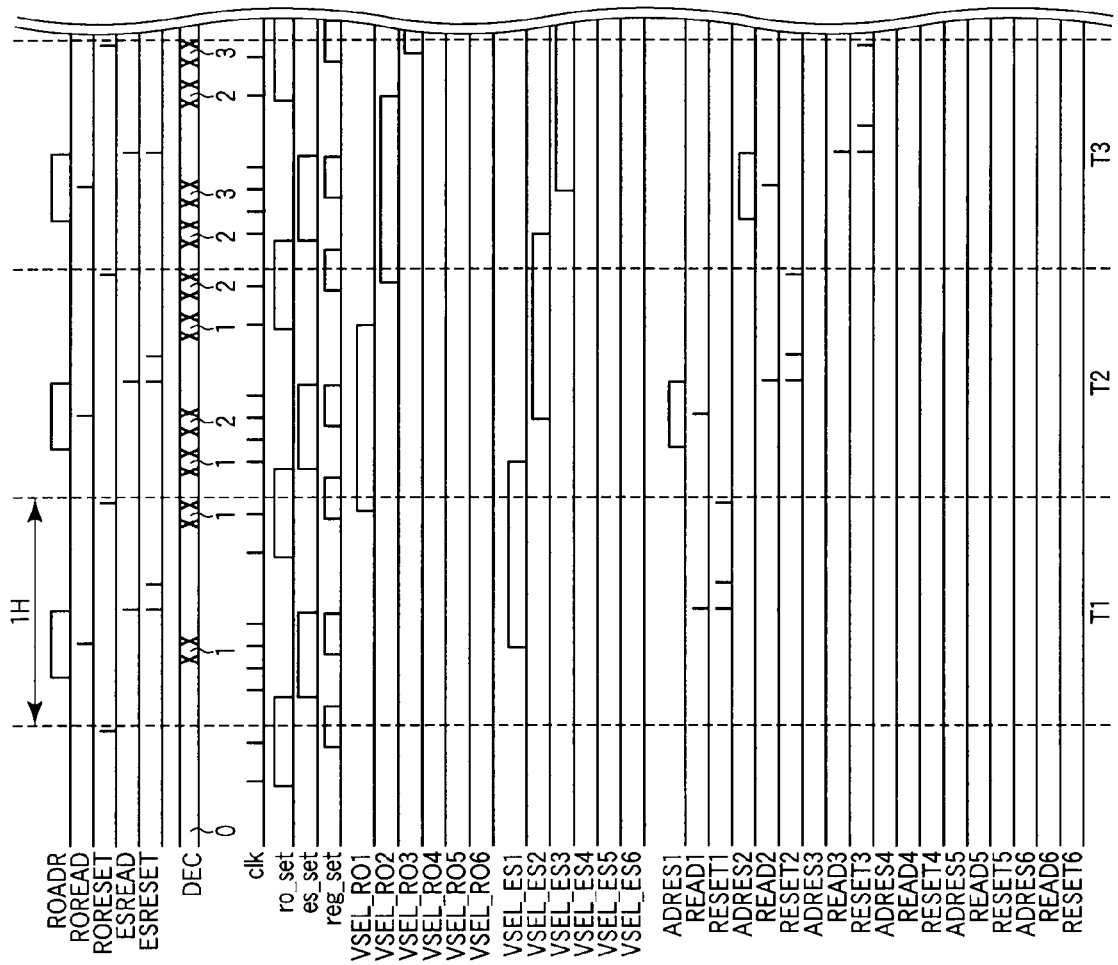
FIG. 8A, FIG. 8B and FIG. 8C are timing charts to explain another example of a standard read operation of a solid-state imaging device shown in FIG. 1.
Figure 8B:
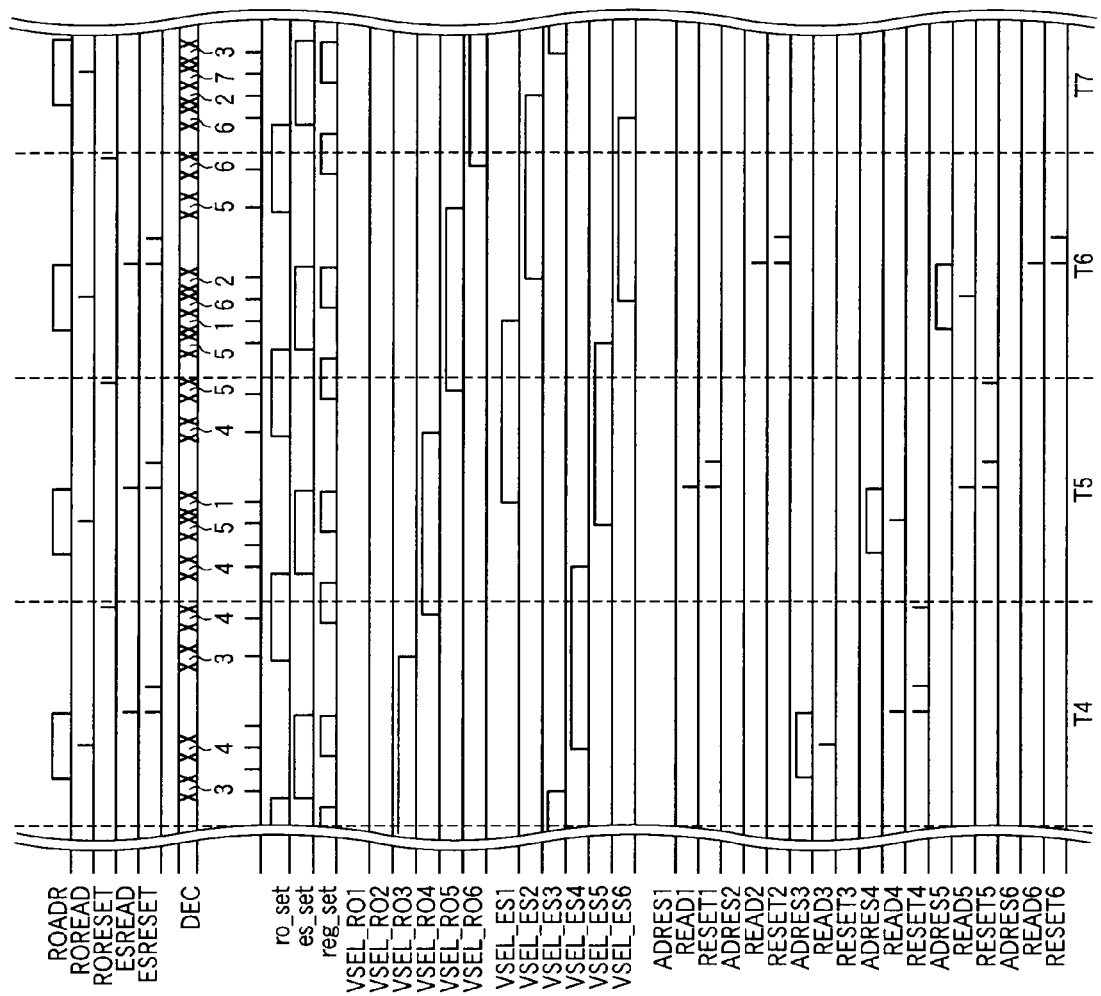
Figure 8C:
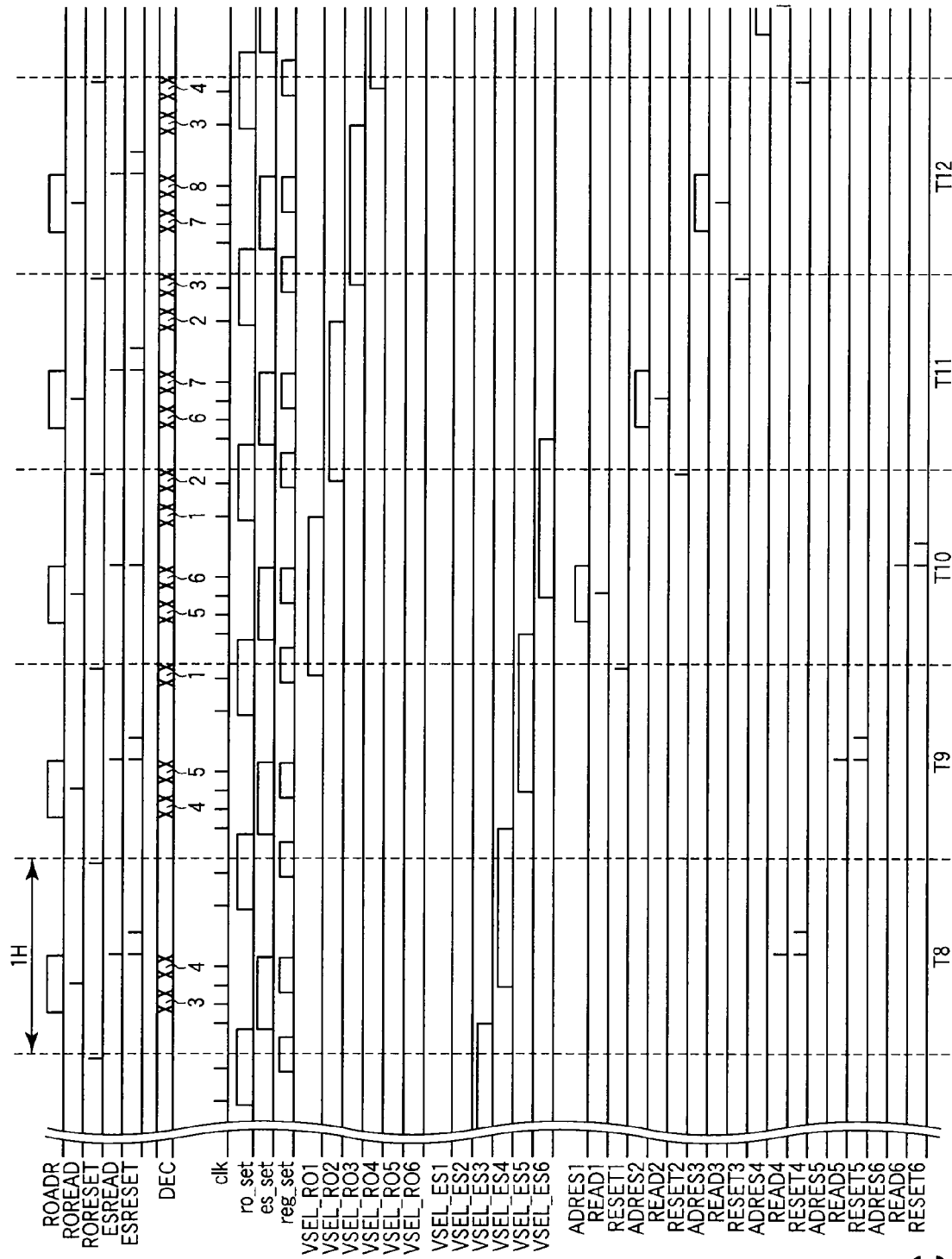

As described before, the conventional image sensor has a possibility that if an electronic shutter interval is changed from short setting to long setting, two kinds of electronic shutter interval having different start time are overlapped. FIGS. 8A to 8C are timing charts to explain another example of the standard read operation. Namely, FIGS. 8A to 8C show the case where an electronic shutter interval is changed from short setting to long setting halfway in the all-rows read operation. FIGS. 8A and 8B are timing charts in the vicinity of the start time of the all-rows read operation. FIG. 8C is a timing chart after an electronic shutter interval is changed from short setting to long setting.

Each operation of one horizontal scanning interval (1H) shown by T1 to T4 of FIGS. 8A and 8B is the same as the case described in FIG. 4. Operations after one horizontal scanning interval (1H) shown by T5 of FIG. 8B are different from the operation described in FIG. 4. In one horizontal scanning interval (1H) shown by T5, a row address DEC is set to 5, and thereafter, set to 1 in order to select the first row. In other words, an electronic shutter interval is changed from short setting to long setting from one horizontal scanning interval (1H) shown by T5. In this way, the electronic shutter row select signal VSEL_ES1 corresponding to the first row is set to level "1" during the period when the electronic shutter row select signal VSEL_ES5 corresponding to the fifth row is set to level "1". Therefore, in one horizontal scanning interval (1H) shown by T5, discharging is based on reset and read drive pulse signals RESET5 and READ5 in each unit cell of the fifth pixel row. Simultaneously, discharging is based on reset and read drive pulse signals RESET1 and READ1 in each unit cell of the first pixel row.

In the next one horizontal scanning interval (1H) shown by T6 following T5, a row address DEC is set to 6, and thereafter, set to 2 in order to select the second row. In other words, an electronic shutter interval is changed from short setting to long setting from one horizontal scanning interval (1H) shown by T5. In this way, the electronic shutter row select signal VSEL_ES2 corresponding to the second row is set to level "1" during the period when the electronic shutter row select signal VSEL_ES6 corresponding to the sixth row is set to level "1". Therefore, in one horizontal scanning interval (1H) shown by T6, discharging is based on reset and read drive pulse signals RESET6 and READ6 in each unit cell of the sixth pixel row. Simultaneously, discharging is based on reset and read drive pulse signals RESET2 and READ2 in each unit cell of the second pixel row. Thereafter, each unit cell of two pixel rows is discharged simultaneously.

In each unit cell of the fifth pixel row discharging in one horizontal scanning interval (1H) of T5, the charge is read in one horizontal scanning interval (1H) of T6. On the other hand, charge reading from each unit cell of the first pixel row discharging simultaneously with the fifth pixel row in the foregoing 1H interval is carried out in one horizontal scanning interval (1H) shown by T10 of FIG. 8C. Hereinafter, charge reading is carried out after an electronic shutter interval is changed to long setting in one horizontal scanning interval (1H) after T11.

As can be seen from the foregoing description, the timing generator circuit 102 executes the following control in addition to the foregoing time division multiplex setting control. According to the control, the circuit 102 generates a plurality of row addresses within one horizontal scanning interval with respect to the imaging area 11, and thereafter, supplies them to the vertical selector circuit 100. Then, the circuit 102 controls the operation of vertical selector circuit 100 and pulse selector circuit 101. In this way, it is possible to prevent a state that two kinds of electronic shutter intervals having different start time are overlapped.

This embodiment relates to the case where each unit cell shown in FIG. 1 is provided with one photodiode. In this case, each unit cell shown in FIG. 1 may be provided with two or four photodiodes While certain embodiment has been described, this embodiment has been presented by way of example only, and is not intended to limit the scope of the invention. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A solid-state imaging device comprising:
an imaging area including a plurality of pixel rows and columns having a plurality of pixels arrayed like a matrix;
a vertical selector circuit including one row address comparator circuit corresponding to each of the pixel rows, the row address comparator circuit configured to supply a row address in time division within one horizontal scanning interval with respect to the image area, and based on the comparison result of the row address comparator circuit, and configured to output an electronic shutter row select signal and a read row select signal for setting an electronic shutter state and a read state of the corresponding pixel row every pixel row;
a pulse selector circuit configured to supply a plurality of drive pulse signals to each of the pixel rows, which are set to the electronic shutter state and the read state, based on the electronic shutter row select signal and the read row select signal;
a timing generator circuit configured to generate the row address, and configured to supply it to the vertical selector circuit, and further, configured to control each operation of the vertical selector circuit and the pulse selector circuit;
a plurality of vertical signal lines connected in common to a plurality of pixels in each of the pixel columns; and
a plurality of current sources connected to said plurality of vertical signal lines;
wherein each pixel includes:
a photodiode;
a read transistor having a current path and a gate electrode, the current path being interposed between the photodiode and a floating diffusion region;
a row select transistor having a current path and a gate electrode, the current path being interposed between a power supply voltage supply node and the vertical signal line, and the gate electrode being supplied with a row select drive pulse signal;
an amplification transistor having a current path and a gate electrode, the current path being connected in series to the current path of the row select transistor, and the gate electrode being connected to the floating diffusion region; and
a reset transistor having a current path and a gate electrode, the current path being interposed between a power supply voltage supply node and the floating diffusion region, and the gate electrode being supplied with a reset drive pulse signal;
wherein the timing generator circuit is further configured to generate the row address, an electronic shutter set signal, a read set signal, a register value set signal, a clock signal and a reset signal, and configured to supply these signals to the vertical selector circuit, and configured to generate a read control pulse signal, a read reset control pulse signal, a read row select control pulse signal, an electronic shutter read control pulse signal and an electronic shutter reset control pulse signal, and configured to supply these signals to the pulse selector circuit;
wherein the vertical selector circuit includes the following registers and selector circuits corresponding to each of the pixel rows:
a first register configured to receive a first signal, and configured to store the received first signal, and configured to output the electronic shutter row select signal;
a second register configured to receive a second signal, and configured to store the received second signal, and configured to output the read row select signal;
a first selector circuit having first and second input terminals and a first select terminal, the first input terminal being supplied with the register value set signal, the second input terminal being supplied with the electronic shutter row select signal, and the first select terminal being supplied with the electronic shutter set signal, the first selector circuit configured to select and output any one of the register value set signal and the electronic shutter row select signal based on the electronic shutter set signal;
a second selector circuit having third and fourth input terminals and a second select terminal, the third input terminal being supplied with an output signal of the first selector circuit, the fourth input terminal being supplied with the electronic shutter row select signal, and the second select terminal being supplied with an output signal of the row address comparator circuit, the second selector circuit configured to select any one of the output signal of the first selector circuit and the electronic shutter row select signal based on the output signal of the row address comparator circuit, and configured to output the selected signal as the first signal;

a third selector circuit having fifth and sixth input terminals and a third select terminal, the fifth input terminal being supplied with the register value set signal, the sixth input terminal being supplied with the read row select signal, and the third select terminal being supplied with the read set signal, the third selector circuit configured to select and output any one of the register value set signal and the read row select signal based on the electronic shutter set signal; and a fourth selector circuit having seventh and eighth input terminals and a fourth select terminal, the seventh input terminal being supplied with an output signal of the third selector circuit, the eighth input terminal being supplied with the read row select signal, and the fourth select terminal being supplied with an output signal of the row address comparator circuit, the fourth selector circuit configured to select any one of the output signal of the third selector circuit and the read row select signal based on the output signal of the row address comparator circuit, and configured to output the selected signal as the second signal.

2. The device according to claim 1, wherein the first register configured to store the first signal synchronizing with the clock signal, and configured to reset the stored content synchronizing with the reset signal; and the second register configured to store the second signal synchronizing with the clock signal, and configured to reset the stored content synchronizing with the reset signal.

3. A solid-state imaging device, comprising:

an imaging area including a plurality of pixel rows and columns having a plurality of pixels arrayed like a matrix;

a vertical selector circuit including one row address comparator circuit corresponding to each of the pixel rows, the row address comparator circuit configured to supply a row address in time division within one horizontal scanning interval with respect to the image area, and based on the comparison result of the row address comparator circuit, and configured to output an electronic shutter row select signal and a read row select signal for setting an electronic shutter state and a read state of the corresponding pixel row every pixel row;

a pulse selector circuit configured to supply a plurality of drive pulse signals to each of the pixel rows, which are set to the electronic shutter state and the read state, based on the electronic shutter row select signal and the read row select signal;

a timing generator circuit configured to generate the row address, and configured to supply it to the vertical selector circuit, and further, configured to control each operation of the vertical selector circuit and the pulse selector circuit;

a plurality of vertical signal lines connected in common to a plurality of pixels in each of the pixel columns; and a plurality of current sources connected to said plurality of vertical signal lines;

wherein each pixel includes:
a photodiode;
a read transistor having a current path and a gate electrode, the current path being interposed between the photodiode and a floating diffusion region;
a row select transistor having a current path and a gate electrode, the current path being interposed between a power supply voltage supply node and the vertical signal line, and the gate electrode being supplied with a row select drive pulse signal;
an amplification transistor having a current path and a gate electrode, the current path being connected in series to the current path of the row select transistor, and the gate electrode being connected to the floating diffusion region; and
a reset transistor having a current path and a gate electrode, the current path being interposed between a power supply voltage supply node and the floating diffusion region, and the gate electrode being supplied with a reset drive pulse signal;

wherein the timing generator circuit is further configured to generate the row address, an electronic shutter set signal, a read set signal, a register value set signal, a clock signal and a reset signal, and configured to supply these signals to the vertical selector circuit, and configured to generate a read control pulse signal, a read reset control pulse signal, a read row select control pulse signal, an electronic shutter read control pulse signal and an electronic shutter reset control pulse signal, and configured to supply these signals to the pulse selector circuit;

wherein the pulse selector circuit includes the following AND gates and OR gates corresponding to each of the pixel rows:

a first AND gate configured to supply with the read row select control pulse signal and the electronic shutter row select signal, and configured to output the row select drive pulse signal;

a second AND gate configured to supply with the read reset control pulse signal and the read row select signal;

a third AND gate configured to supply with the read-only reset control pulse signal and the read row select signal;

a fourth AND gate configured to supply with the electronic shutter reset control pulse signal and the electronic shutter row select signal;

a fifth AND gate configured to supply with the electronic shutter read control pulse signal and the electronic shutter row select signal;

a first OR gate configured to supply with each output signal of first and fourth AND gates, and configured to output the reset drive pulse signal; and a second OR gate configured to supply with each output signal of third and fifth AND gates, and configured to output the read drive pulse signal.

* * * * *